United States Patent [19]

He et al.

[11] Patent Number: 6,075,716
[45] Date of Patent: *Jun. 13, 2000

[54] TWO-STAGE, THREE PHASE BOOST CONVERTER WITH REDUCED TOTAL HARMONIC DISTORTION

[75] Inventors: Jin He, Plano; Mark E. Jacobs, Dallas, both of Tex.

[73] Assignee: Lucent Technologies Inc., Murray Hill, N.J.

[ * ] Notice: This patent is subject to a terminal disclaimer.

[21] Appl. No.: 09/286,856

[22] Filed: Apr. 6, 1999

[51] Int. Cl.[7] .................................................. H02M 1/12
[52] U.S. Cl. ................................ 363/44; 363/70; 363/89; 363/126; 323/222
[58] Field of Search .................................. 363/44, 67, 69, 363/70, 89, 126; 323/222, 272

[56] References Cited

U.S. PATENT DOCUMENTS

| | | | |
|---|---|---|---|
| 5,414,613 | 5/1995 | Chen | 363/89 |
| 5,446,646 | 8/1995 | Miyazaki | 363/89 |
| 5,506,766 | 4/1996 | Takahashi | 363/126 |
| 5,627,455 | 5/1997 | Jacobs et al. | 323/222 |
| 5,654,882 | 8/1997 | Kanazawa et al. | 363/89 |
| 5,689,410 | 11/1997 | Jiang | 363/56 |
| 5,764,037 | 6/1998 | Jacobs et al. | 323/222 |
| 5,793,625 | 8/1998 | Balogh | 323/222 |
| 5,844,790 | 12/1998 | Jacobs et al. | 363/47 |
| 5,847,949 | 12/1998 | Jiang | 363/65 |
| 5,886,891 | 3/1999 | Jiang et al. | 363/89 |
| 5,894,214 | 4/1999 | Jiang | 323/222 |

OTHER PUBLICATIONS

Prasad et. al., "An Active Power Factor Correction Technique for Three–Phase Diode Rectifiers", Sep. 1989 IEEE PESC Proceedings, pp 58–66.

Ismail et. al., "A Single Transistor Three Phase Resonant Switch for High Quality Rectification", Mar. 1992 IEEE PESC Proceedings, pp 1341–1351.

Jiang et. al., "Simple High Performance Three–Phase Boost Rectifiers", Dec. 1994 VPEC Seminar Proceedings, pp 39–44.

Zhang et. al., "Optimum PWM Pattern for a Three–Phase Boost DCM PFC Rectifier", Dec. 1996 VPEC Annual Seminar Proceedings, pp 35–42.

*Primary Examiner*—Jeffrey Sterrett

[57] ABSTRACT

For use with a three-phase split boost converter having a primary stage with a primary rectifier and first and second primary boost switches coupled between an input and first and second outputs of the three-phase split boost converter, an auxiliary stage interposed between the input and the first and second outputs, a method of reducing input current total harmonic distortion (THD) and a converter incorporating the auxiliary stage or the method. In one embodiment, the auxiliary stage includes: (1) first, second and third auxiliary boost inductors coupled to corresponding phases of the input and (2) an auxiliary boost network interposed between the first, second and third auxiliary boost inductors and the first and second outputs and including (2a) an auxiliary three phase full-wave rectifier, (2b) first and second auxiliary boost diodes, and (2c) first and second auxiliary boost switches, coupled between the auxiliary three phase full-wave rectifier and the first and second auxiliary boost diodes, that cooperate to conduct currents through the first, second and third auxiliary boost inductors to reduce input current total harmonic distortion (THD) at the input of the three-phase split boost converter.

21 Claims, 6 Drawing Sheets

TWO-STAGE, THREE PHASE BOOST CONVERTER WITH REDUCED TOTAL HARMONIC DISTORTION

CROSS-REFERENCE TO RELATED APPLICATIONS

This application is related to the following U.S. patents and patent applications:

| Reference No. | Title | Inventor(s) | Date |
| --- | --- | --- | --- |
| U.S. Ser. No. 09/199,289 | TWO-STAGE, THREE-PHASE BOOST CONVERTER AND METHOD OF REDUCING TOTAL HARMONIC DISTORTION FOR THE SAME | He, et al. | Filed November 24, 1998 |
| U.S. Ser. No. 09/183,076 | DUAL MODE SPLIT-BOOST CONVERTER AND METHOD OF OPERATION THEREOF | Jacobs, et al. | Filed October 30, 1998 |
| U.S. Ser. No. 09/133,105 | TWO-STAGE, THREE-PHASE SPLIT BOOST CONVERTER AND METHOD OF REDUCING TOTAL HARMONIC DISTORTION FOR THE SAME | He, et al. | Filed August 12, 1998 |
| U.S. Ser. No. 09/133,068 | TWO-STAGE, THREE-PHASE SPLIT BOOST CONVERTER AND METHOD OF REDUCING TOTAL HARMONIC DISTORTION FOR THE SAME | He, et al. | Filed August 12, 1998 |
| U.S. Ser. No. 08/975,398 | DUAL-OUTPUT BOOST CONVERTER HAVING ENHANCED INPUT OPERATING RANGE AND METHOD OF OPERATION THEREOF | Jiang | Filed November 20, 1997 |
| U.S. Ser. No. 08/975,398 | DUAL-OUTPUT BOOST CONVERTER HAVING ENHANCED INPUT OPERATING RANGE AND METHOD OF OPERATION THEREOF | Jiang | Filed November 20, 1997 |
| U.S. Pat. No. 5,847,949 | BOOST CONVERTER HAVING MULTIPLE OUTPUTS AND METHOD OF OPERATION THEREOF | Jiang | Issued December 8, 1998 |
| U.S. Pat. No. 5,844,790 | SPLIT-BOOST CONVERTER HAVING DAMPED EMI ISOLATION FILTER AND METHOD OF OPERATION THEREOF | Jacobs, et al. | Issued December 1, 1998 |
| U.S. Pat. No. 5,764,037 | A HIGH EFFICIENCY BOOST TOPOLOGY WITH TWO OUTPUTS | Jacobs, et al. | Issued June 9, 1998 |
| U.S. Pat. No. 5,689,410 | SPLIT-BOOST CIRCUIT HAVING IMBALANCE PROTECTION CIRCUITRY | Jiang | Issued November 18, 1997 |
| U.S. Pat. No. 5,627,455 | BOOST TOPOLOGY WITH TWO OUTPUTS FOR POWER FACTOR CORRECTION APPLICATION | Jacobs, et al. | Issued May 6, 1997 |

The above-listed applications are commonly assigned with the present invention and are incorporated herein by reference as if reproduced herein in their entirety.

TECHNICAL FIELD OF THE INVENTION

The present invention is directed, in general, to power conversion and, more specifically, to a three phase split boost converter having a primary stage and an auxiliary stage employing an auxiliary boost network and a method of reducing total harmonic distortion (THD) at the input of the three-phase split boost converter.

BACKGROUND OF THE INVENTION

Poor input power factor and high input current total harmonic distortion (THD) generated by phase controlled and uncontrolled diode bridge rectifiers are well known problems in the power converter/rectifier industry. Low power factor and high THD commonly leads to input AC voltage distortions, AC distribution system losses, neutral harmonic currents, excitation of system resonances, and over-rated back-up alternator KVA ratings for telecommunication applications. To combat these problems, designers have attempted to develop improved three-phase rectifiers or converters which draw nearly sinusoidal line currents with low harmonic content and with high displacement power factor.

Boost converters are commonly used in power factor correction AC/DC rectifier applications as line conditioners. Typically, continuous conduction mode (CCM) boost converters are the topology of choice for providing a highly regulated output voltage from substantially lower DC voltages derived from sinusoidal input voltages. The boost stage processes the AC input and develops a DC output voltage, typically 400 V or 800 V. The use of split boost converter topology in high input voltage conditions is particularly attractive because of several advantages, such as reduced boost inductor sizes, lower voltage rating switches and capacitors and higher efficiency.

A split boost topology provides two equal but unparallelable voltages via two output capacitors. Efficiency is achieved by limiting the lowest input voltage to a value of the voltage level of each of the two output voltages. The use of a split boost topology permits the use of power switching semiconductor devices rated at half the breakdown voltage required by a conventional power factor corrected boost stage, while still providing high power conversion efficiency. For example, a DC/DC bridge converter operating with 480 Vac line input and having outputs with an intermediate DC bus voltage of only 400V may employ readily available 600V semiconductor switching devices and 450V aluminum electrolytic energy storage capacitors, without compromising efficiency. The split boost converter optimizes the use of power switches without compromising the advantages found in the three-level boost converter, such as a reduced boost inductor size.

Although the split boost converter provides many advantages, it does not completely solve the poor input power factor and high input total harmonic distortion (THD) problems implicit in three-phase high power rectification applications. For example, the input current drawn by the three-phase split-boost converter exhibits a non-sinusoidal wave-shape of a discontinuous 120° conduction type. An input current waveform of a three-phase, split boost converter while powering a heavy load is typically clipped and appears as a square wave, rather than a true sinusoid. Such low power factor and high THD commonly leads to the problems as addressed above. In an effort to correct these problems, circuit designers have attempted to develop three-phase rectifiers or converters which draw nearly sinusoidal line currents with low harmonic content and high displacement power factor.

Recently, the power supply industry has become very cost sensitive, with low production cost being the key to success.

Additionally, three-phase system THD requirements vary, with the international market THD requirement often being in the vicinity of 20 percent, as opposed to the domestic market which can accommodate THD of up to approximately 40 percent. Also, some corrective circuits may require ultra-fast recovery diode bridge rectifiers and a current-limiting turn-on circuit such as a snubber.

Accordingly, what is needed in the art is a three-phase, split boost converter topology that is cost effective, but exhibits a higher power factor while reducing input current THD.

SUMMARY OF THE INVENTION

To address the above-discussed deficiencies of the prior art, the present invention provides an auxiliary stage for a three-phase split boost converter, a three-phase split boost converter having a primary stage and employing the auxiliary stage, and a method of reducing input current total harmonic distortion (THD) therefor.

In one embodiment, the auxiliary stage includes: (1) first, second and third auxiliary boost inductors coupled to corresponding phases of an input of the three-phase split boost converter and (2) an auxiliary boost network interposed between the first, second and third auxiliary boost inductors and first and second outputs of the three-phase split boost converter and including (2a) an auxiliary three phase full-wave rectifier, (2b) first and second auxiliary boost diodes, and (2c) first and second auxiliary boost switches, coupled between the auxiliary three phase full-wave rectifier and the first and second auxiliary boost diodes, that cooperate to conduct currents through the first, second and third auxiliary boost inductors to reduce input current total harmonic distortion (THD) at the input of the three-phase split boost converter.

The present invention introduces the broad concept of employing an auxiliary boost stage in a three-phase split boost converter to reduce the input current THD and also improve the overall power factor of the converter. The auxiliary boost network includes an auxiliary rectifier, first and second auxiliary boost diodes and first and second auxiliary boost switches that cooperate to orchestrate the conduction of currents through the first, second and third auxiliary boost inductors. Additionally, the auxiliary stage reduces the stresses on several of the components in the converter allowing for more judicious and economical component selections.

In one embodiment of the present invention, the first and second auxiliary boost switches are coupled across the auxiliary three phase full-wave rectifier. In a related, but alternative embodiment, the first auxiliary boost switch is interposed between said first and second auxiliary boost diodes.

In one embodiment of the present invention, the second auxiliary boost switch transitions between conducting and nonconducting states under a substantially zero current condition. This eliminates the need for a current-limiting, turn-on circuit such as a snubber circuit. Eliminating the snubber circuit reduces component count and therefore cost as well as enhancing overall reliability.

In one embodiment of the present invention, the first and second auxiliary boost switches transition from a nonconducting to a conducting state proximally. In a related, but alternative embodiment, the first auxiliary boost switch also transitions to a nonconducting state while the second auxiliary boost switch is in a conducting state. Of course, variations of the aforementioned transition periods are well within the broad scope of the present invention.

In one embodiment of the present invention, the auxiliary three phase full-wave rectifier comprises six diodes arranged in a bridge. However, any rectifier topology is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
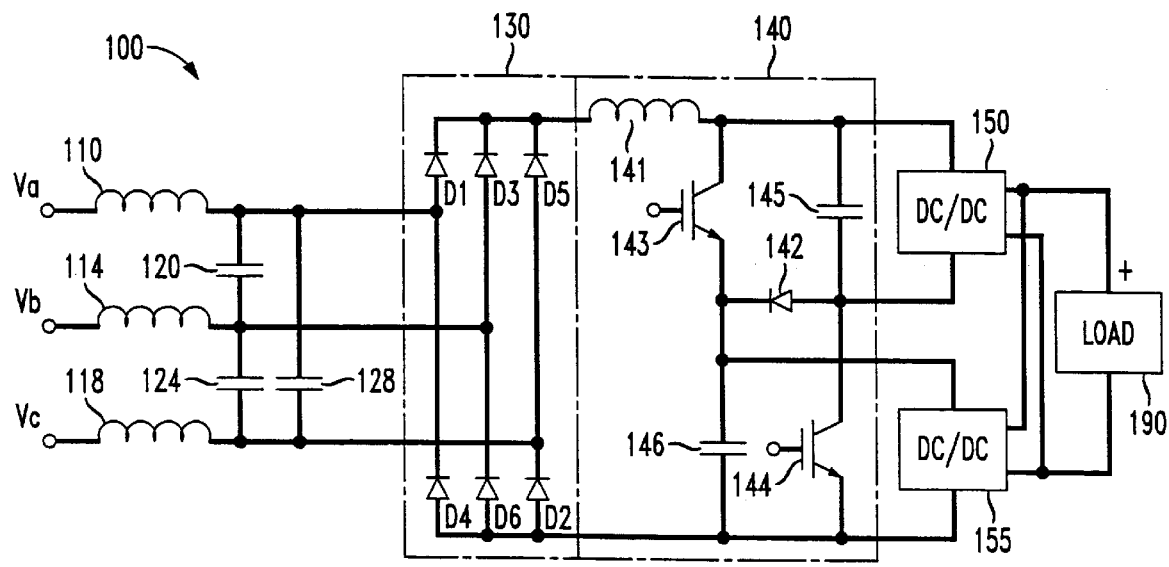
FIG. 1 illustrates a schematic diagram of a prior art three-phase split boost converter.

Referring initially to FIG. 1, illustrated is a schematic diagram of a prior art three-phase split boost converter 100. The three-phase split boost converter 100 receives input power from an AC voltage source in three phases Va, Vb, Vc. The illustrated embodiment employs an EMI filter by introducing Va, Vb, and Vc through first, second and third EMI filter inductors 110, 114, 118, respectively. A first filter capacitor 120 is coupled between the first and second EMI filter inductors 110, 114 and a second filter capacitor 124 is coupled between the second and third EMI filter inductors 114, 118. Finally, a third filter capacitor 128 is coupled between the first and third EMI filter inductors 110, 118. The EMI filter inductors 110, 114, 118 are also coupled to a three-phase diode bridge rectifier 130 that includes a plurality of diodes D1–D6 arranged in a full bridge configuration. The three-phase diode bridge rectifier 130 is further coupled to the split boost stage 140.

The split boost stage 140 includes a main boost power inductor 141, a boost diode 142 that acts as a switch, two active switches 143, 144, and two output capacitors 145, 146. The output capacitors 145, 146 are relatively large and the voltages across them are essentially constant and equal during one switching cycle. The boost stage can supply two equal output loads. The loads from the two outputs can be subsequently combined in the isolated low voltage end. In the illustrated embodiment, the first output is supplied via output capacitor 146 and is coupled to high frequency, transformer isolated DC/DC converter 155. The second output is supplied via output capacitor 145 and is coupled to high frequency, transformer isolated DC/DC converter 150. The output of the two high frequency DC/DC converters 150, 155 are coupled to supply the load 190. Conventional control circuitry, which is not shown, drives the active switches 143, 144 proximally and is not described herein.

The switches 143, 144 are closed and opened at the same time. When the switches 143, 144 are closed, the output capacitors 145, 146 are connected in parallel since the boost diode 142 is non-conducting in this mode. A current through the boost power inductor 141 increases linearly to store energy in the output capacitors 145, 146 and in the boost inductor 141. When the switches 143, 144 are open, the energy stored in the boost power inductor 141 is delivered to the load through the boost diode 142 and the now series combination of capacitors 145, 146. The output voltages across the output capacitors 145, 146 are maintained at an essentially equal level when the switches 143, 144 are closed and when the switches 143, 144 are opened by controlling two loads equally.

A detailed description of the operation of two-stage, three-phase split boost converters is disclosed in detail in U.S. Pat. No. 5,764,037, "High Efficiency Boost Topology with Two Outputs" to Jacobs and Farrington, and is incorporated herein by reference. Although the use of split boost converter topology in high input voltage conditions offers several advantages, its application would be even more advantageous if the converter could improve on input power factor and THD problems that exist in the power conversion business.

Figure 2:
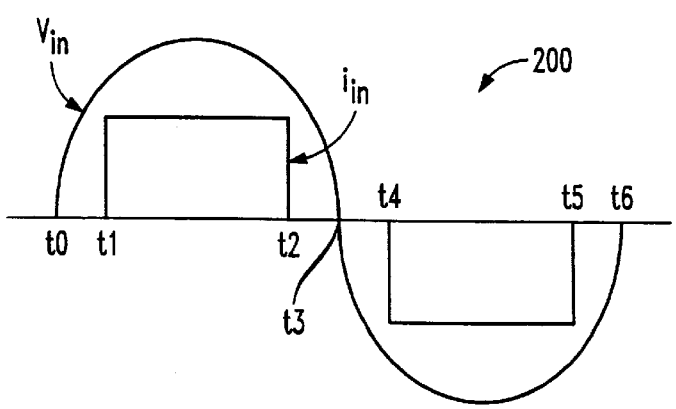
FIG. 2 illustrates a typical input waveform for the prior art three-phase split-boost converter illustrated in FIG. 1.

Turning now to FIG. 2, illustrated is a typical input waveform 200 for the prior art split-boost converter illustrated in FIG. 1. The input waveform 200 includes both an input voltage component Vin and an input current component Iin. The input voltage Vin is shown as a typical sinusoidal wave, whereas the input current Iin drawn by the three-phase split boost converter exhibits a non-sinusoidal wave-shape. The input current Iin appears as a clipped non-continuous 120° conduction-type square wave. Preferably the input current Iin should appear as a sinusoidal wave with no phase shift from the input voltage Vin. Unfortunately, input line current harmonic distortion, or total harmonic distortion (THD), forces the input current Iin to be clipped into the present form, thus reducing the overall power factor. During four time segments of the line frequency cycle, namely, time segments t0–t1, t2–t3, t3–t4, t5–t6, there is substantially zero current. The transitions during these time periods, from positive current to substantially zero current to negative current to substantially zero current, cause current harmonics to be generated that impair the power supply system. By shaping the input current Iin into a sinusoidal-like form the substantially zero-current time segments can be reduced or eliminated and current THD can be reduced.

Figure 3:
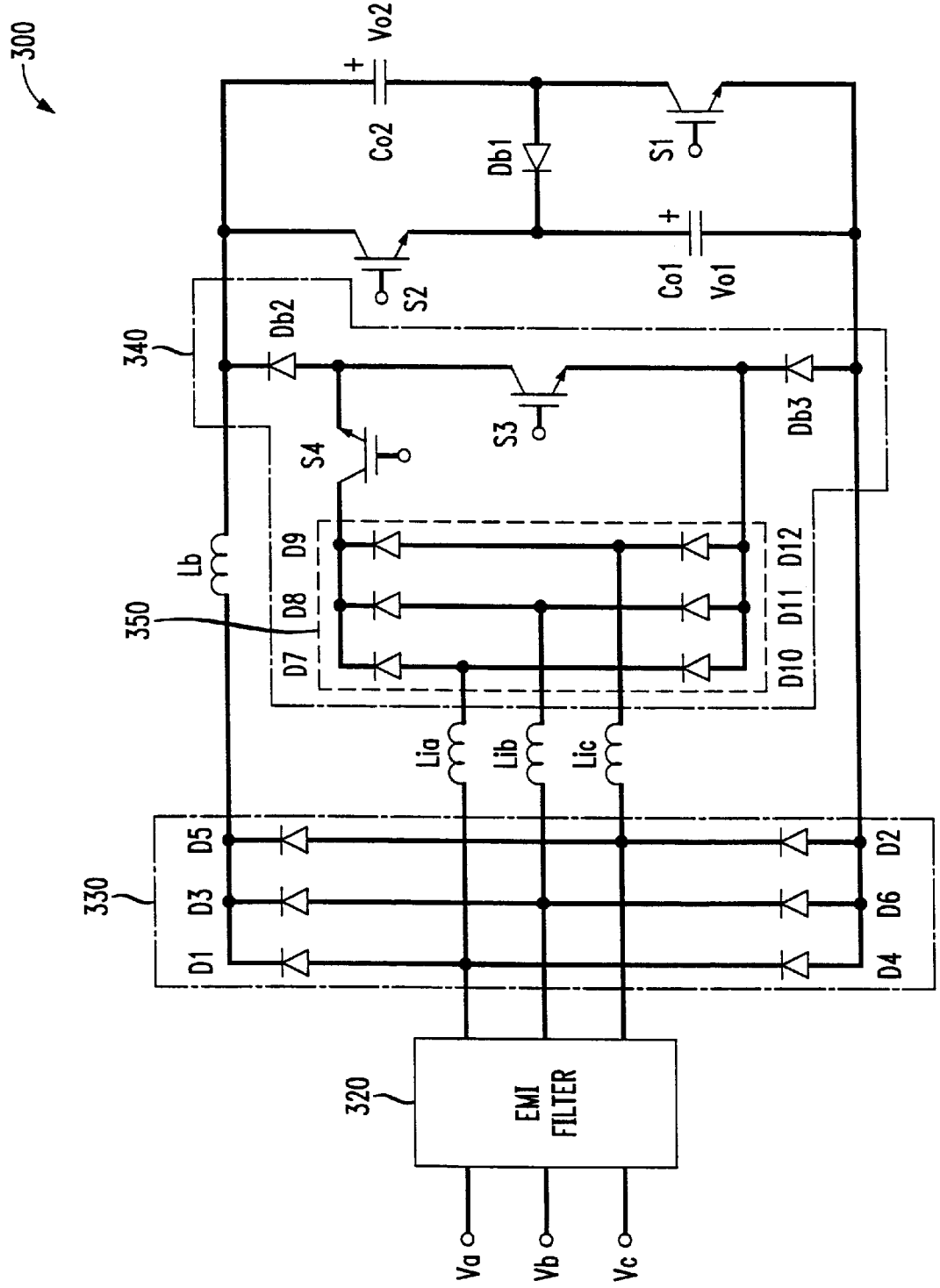
FIG. 3 illustrates a schematic diagram of an embodiment of an improved two-stage, three-phase split boost (TSTPSB) converter constructed according to the principles of the present invention.

Turning now to FIG. 3, illustrated is a schematic diagram of an embodiment of a two-stage, three-phase split boost (TSTPSB) converter 300 constructed according to the principles of the present invention. The TSTPSB converter 300 includes a primary stage having an input that receives input power from an AC voltage source in three phases Va, Vb, Vc, and an EMI filter 320 coupled to a three-phase diode bridge primary rectifier 330 having a plurality of diodes D1–D6 arranged in a full bridge configuration. The primary stage further includes first and second primary boost switches S1, S2 coupled to the primary rectifier 330, a primary boost inductor Lb and a primary boost diode Db1. First and second outputs Vo1, Vo2 of the TSTPSB converter 300 are coupled across first and second filter capacitors Co1, Co2 that are in turn coupled to the first and second primary boost switches S1, S2, respectively.

The TSTPSB converter 300 further includes an auxiliary stage interposed between the input and the first and second outputs Vo1, Vo2 having first, second and third auxiliary boost inductors Lia, Lib, Lic coupled to corresponding phases of the input, and an auxiliary boost network 340 interposed between the first, second and third auxiliary boost inductors Lia, Lib, Lic and the first and second outputs Vo1, Vo2. The auxiliary boost network 340 includes an auxiliary three phase full-wave rectifier 350 with a plurality of diodes D7–D12 arranged in a full bridge configuration, first and second auxiliary boost diodes Db2, Db3, and first and second auxiliary boost switches S3, S4 that cooperate to conduct currents through the first, second and third auxiliary boost inductors Lia, Lib, Lic to reduce input current THD of the TSTPSB converter 300.

The three-phase split boost converter 300 exhibits lower input current THD and improved overall power factor. The configuration of the auxiliary boost network 340 allows the auxiliary rectifier 350, first and second auxiliary boost diodes Db2, Db3, and first and second auxiliary boost switches S3, S4 to cooperate more effectively. This cooperation results in the orchestration of current conduction through the first, second and third auxiliary boost inductors Lia, Lib, Lic thereby reducing the input current THD. Additionally, stresses on several of the components in the converter are reduced allowing for more judicious and economical component selections.

In the present embodiment, the auxiliary three-phase full wave rectifier 350 conducts only forward currents due to a discontinuous conduction mode (DCM) of operation of the first auxiliary boost switch S3 and thereby avoids diode reverse recovery currents. This condition allows the use of standard-recovery, low cost bridge rectifiers for the auxiliary three-phase full wave rectifier 350 as opposed to expensive ultra-fast recovery rectifiers, which are more costly.

Additionally, first and second auxiliary boost switches S3, S4 transition to a conducting state under a minimum current condition that is typically substantially zero current. This condition eliminates the need for a current-limiting, turn-on circuit such as a snubber circuit, thereby reducing component count and therefore cost as well. Additionally, turn-on losses for first and second auxiliary boost switches S3, S4 and reverse recovery losses for first and second auxiliary boost diodes Db2, Db3 are also reduced thereby enhancing overall efficiency. This occurs because both the currents through the primary boost inductor Lb and the three-phase diode bridge primary rectifier 330 are continuous during the conduction transition of first and second auxiliary boost switches S3, S4, resulting in a continuous conduction mode (CCM) of operation for the primary stage of the TSTPSB converter 300.

Figure 4:
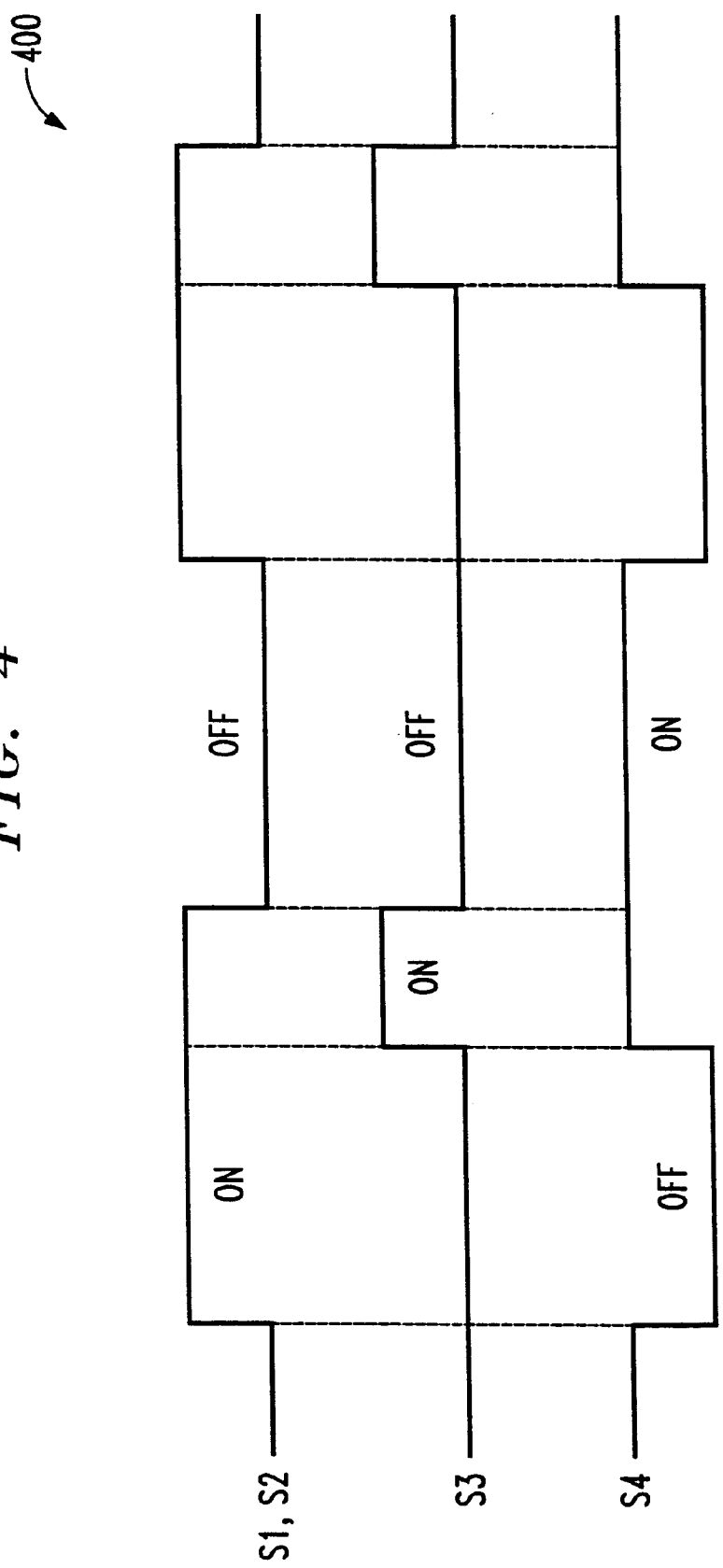
FIG. 4 illustrates a waveform diagram showing the relative states of the primary and auxiliary boost switches for the TSTPSB converter of FIG. 3.

Turning now to FIG. 4, illustrated is a waveform diagram 400 showing the relative states of the primary and auxiliary boost switches for the TSTPSB converter 300 of FIG. 3. The waveform diagram 400 shows that first and second primary boost switches S1, S2 transition between conducting and nonconducting states proximally, and first and second auxiliary boost switches S3, S4 are seen to transition from a nonconducting to a conducting state proximally. The first auxiliary boost switch S3 also transitions to a nonconducting state while the second auxiliary boost switch S4 is in a conducting state. The first and second auxiliary boost switches S3, S4 preferably transition between nonconducting and conducting states under a substantially zero current condition. Furthermore, the second auxiliary switch S4 also preferably transitions from a conducting to a nonconducting state under a substantially zero current condition allowing it to possess essentially zero switching loss. Of course, variations of the aforementioned transition periods are well within the broad scope of the present invention.

Figure 5A:
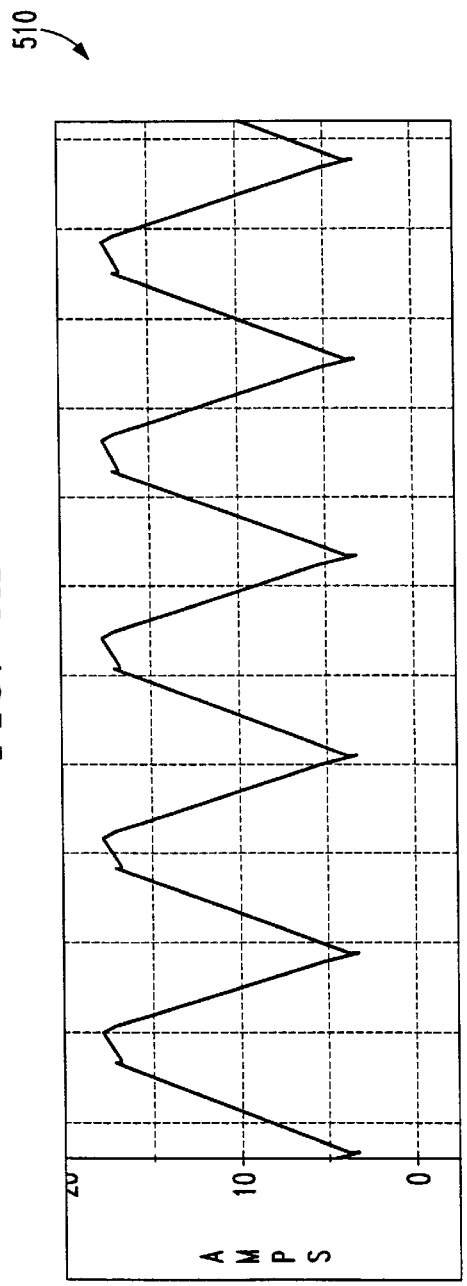
FIG. 5A illustrates a waveform showing the current flowing through the primary boost inductor of the TSTPSB converter of FIG. 3.

Turning now to FIGS. 5A, 5B, 5C and 5D, illustrated are a collection of pertinent current waveforms for the TSTPSB converter of FIG. 3. The FIG. 5A illustrates a waveform 510 showing a primary boost inductor current flowing through the primary boost inductor Lb. The primary boost inductor current is seen to be always greater than zero, indicating that the primary stage of the TSTBSB converter 300 is operating in CCM and therefore provides the majority of the power transferred to the load.

Figure 5B:
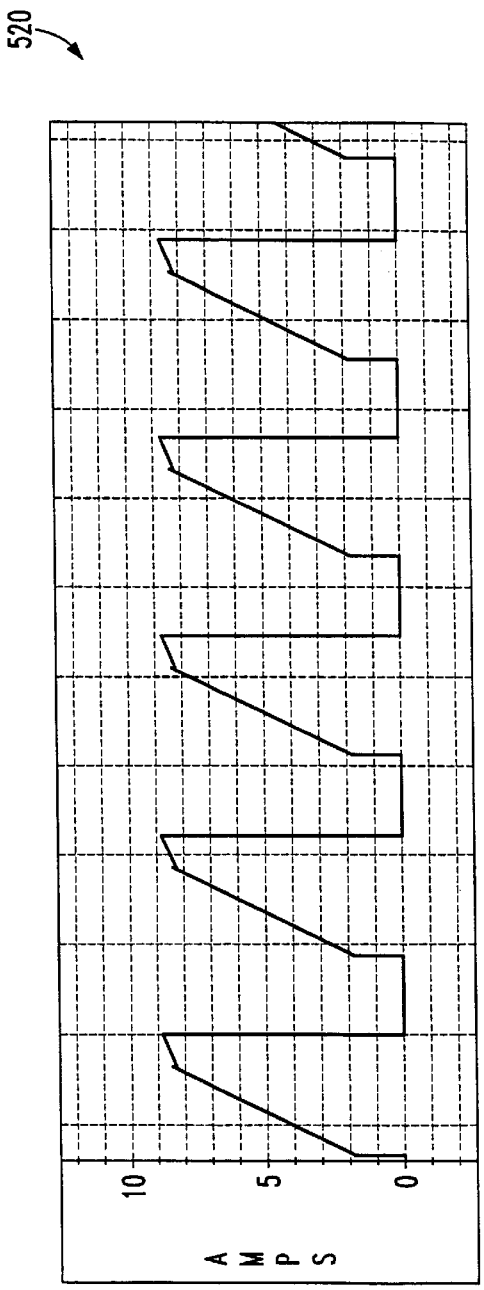
FIG. 5B illustrates a waveform showing the current flowing through the second primary boost switch of the TSTPSB converter of FIG. 3.

The FIG. 5B illustrates a waveform 520 showing a second primary boost switch current flowing through the second primary boost switch S2. The second primary boost switch current indicates that the second primary boost switch S2 has both conducting and nonconducting states as shown in FIG. 4 above. Of course, the first primary boost switch S1 has an analogous current waveform since it has the same conducting and nonconducting states as the second primary boost switch S2.

Figure 5C:
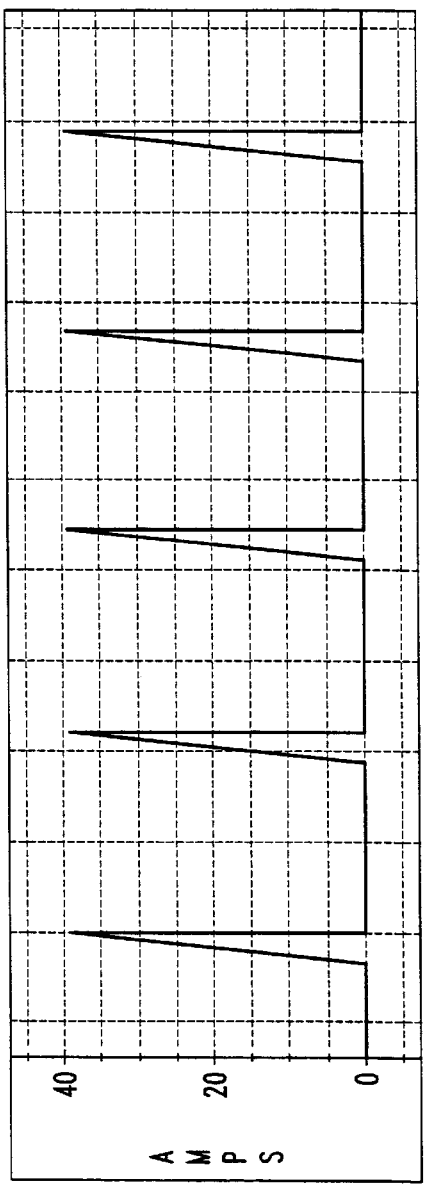
FIG. 5C illustrates a waveform showing the current flowing through the first auxiliary boost switch of the TSTPSB converter of FIG. 3.

FIG. 5C illustrates a waveform 530 showing a first auxiliary boost switch current flowing through the first auxiliary boost switch S3. The first auxiliary boost switch current indicates that the first auxiliary boost switch S3 transitions to a conducting state under a substantially zero current condition.

Figure 5D:
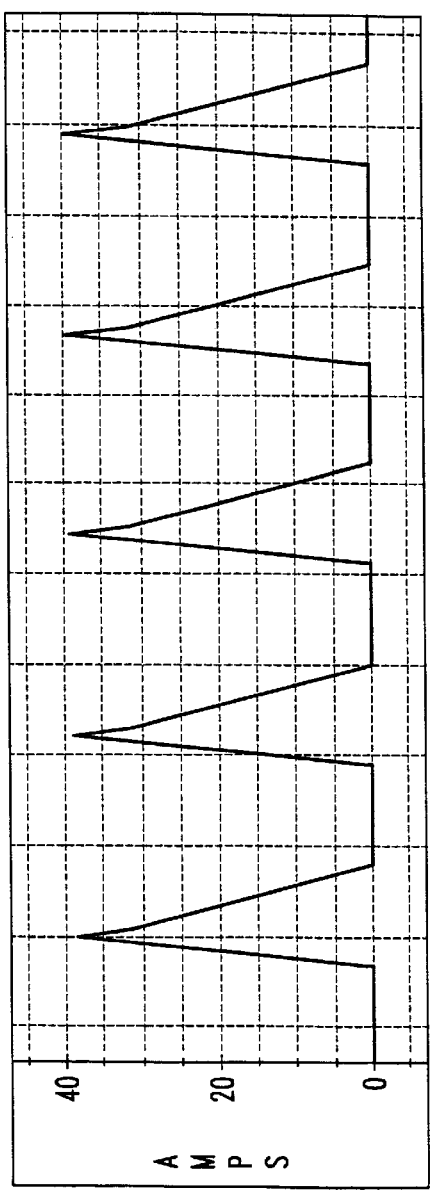
FIG. 5D illustrates a waveform showing the current flowing through the second auxiliary boost switch of the TSTPSB converter of FIG. 3.

FIG. 5D, which illustrates a waveform 540 showing a second auxiliary boost switch current flowing through the second auxiliary boost switch S4, is also seen to transition to a conducting state under a substantially zero current condition. Additionally, the second auxiliary boost switch current is seen to start at the same time and last longer than the first auxiliary boost switch current. The second auxiliary boost switch current ramps down to substantially zero indicating a substantially zero current transition to a nonconducting state for the second auxiliary boost switch S4 as opposed to the first auxiliary boost switch current, which terminates abruptly. The waveforms 530, 540 indicate that the auxiliary stage of the TSTPSB converter 300 operates in a DCM and therefore provides the minority of power delivered to the load.

Figure 6:
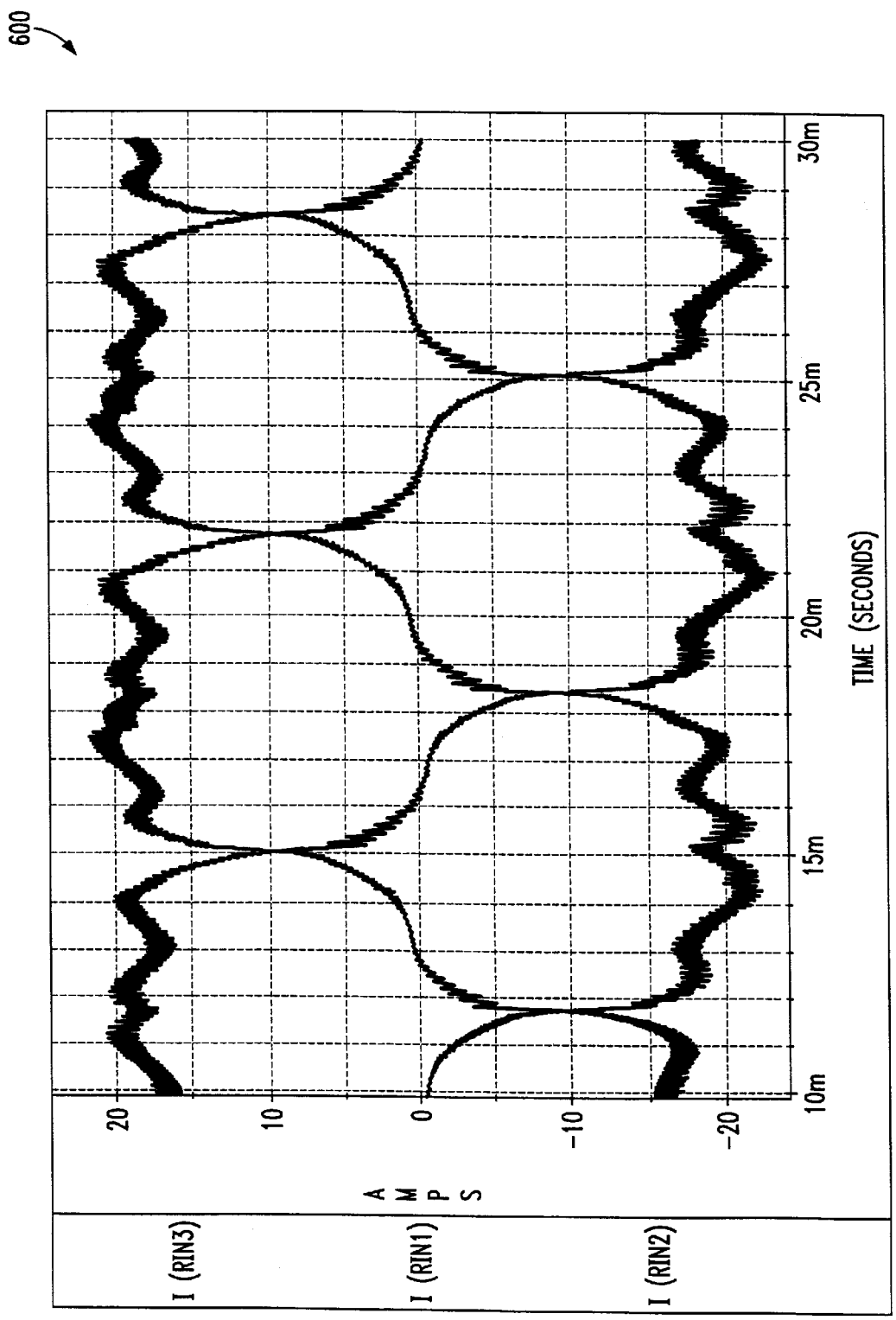
FIG. 6 illustrates a typical input current waveform corresponding to the TSTPSB converter illustrated in FIG. 3.

Turning now to FIG. 6, illustrated is an input current waveform 600 corresponding to the TSTPSB converter 300 of FIG. 3. The input current waveform 600 shows all three input phase currents I(RIN1), I(RIN2), I(RIN3) for sinusoidal input phase voltages (not shown). An input THD of 18% along with a power factor of 0.98 is achievable with the TSTPSB converter 300 of FIG. 3. Thus, the TSTPSB converter 300 achieves markedly improved THD values over the prior art, three-phase split boost converter of FIG. 1 where the THD is typically greater than 32%. This improvement may also be discerned by comparing the three input phase currents I(RIN1), I(RIN2), I(RIN3) of the input current waveform 600 to the input current Iin shown in FIG. 2. The three input phase currents I(RIN1), I(RIN2), I(RIN3) each bear a much closer resemblance to a sinusoidal waveform than the pulse-shaped waveform of the input current Iin, thereby yielding lower input current THD.

For a better understanding of boost converters and, in particular, split boost converters see "An Improved High Efficiency Rectifier for Telecommunication Applications", M. E. Jacobs, et al, 1996 IEEE INTELEC Proceedings, pp. 530–535 which is herein incorporated by reference.

Although the present invention has been described in detail, those skilled in the art should understand that they can make various changes, substitutions and alterations herein without departing from the spirit and scope of the invention in its broadest form.

What is claimed is:

1. For use with a three-phase split boost converter having a primary stage with a primary rectifier and first and second primary boost switches coupled between an input and first and second outputs of said three-phase split boost converter, an auxiliary stage interposed between said input and said first and second outputs and comprising:

first, second and third auxiliary boost inductors coupled to corresponding phases of said input; and an auxiliary boost network interposed between said first, second and third auxiliary boost inductors and said first and second outputs and including:
an auxiliary three phase full-wave rectifier,
first and second auxiliary boost diodes, and
first and second auxiliary boost switches, coupled between said auxiliary three phase full-wave rectifier and said first and second auxiliary boost diodes, that cooperate to conduct currents through said first, second and third auxiliary boost inductors to reduce input current total harmonic distortion (THD) at said input of said three-phase split boost converter.

2. The auxiliary stage as recited in claim 1 wherein said first and second auxiliary boost switches are coupled across said auxiliary three phase full-wave rectifier.

3. The auxiliary stage as recited in claim 1 wherein said first auxiliary boost switch is interposed between said first and second auxiliary boost diodes.

4. The auxiliary stage as recited in claim 1 wherein said second auxiliary boost switch transitions between conducting and nonconducting states under a substantially zero current condition.

5. The auxiliary stage as recited in claim 1 wherein said first and second auxiliary boost switches transition from a nonconducting to a conducting state proximally.

6. The auxiliary stage as recited in claim 1 wherein said first auxiliary boost switch transitions to a nonconducting state while said second auxiliary boost switch is in a conducting state.

7. The auxiliary stage as recited in claim 1 wherein said auxiliary three phase full-wave rectifier comprises six diodes arranged in a bridge.

8. For use with a three-phase split boost converter having a primary stage with a primary rectifier and first and second primary boost switches coupled between an input and first and second outputs of said three-phase split boost converter, a method of reducing input current total harmonic distortion (THD), comprising:

transferring a portion of input current through first, second and third auxiliary boost inductors coupled to corresponding phases of said input; and processing said portion through an auxiliary boost network interposed between said first, second and third auxiliary boost inductors and said first and second outputs, said auxiliary boost network including:
an auxiliary three phase full-wave rectifier,
first and second auxiliary boost diodes, and
first and second auxiliary boost switches coupled between said auxiliary three phase full-wave rectifier and said first and second auxiliary boost diodes.

9. The method as recited in claim 8 wherein said first and second auxiliary boost switches are coupled across said auxiliary three phase full-wave rectifier.

10. The method as recited in claim 8 wherein said first auxiliary boost switch is interposed between said first and second auxiliary boost diodes.

11. The method as recited in claim 8 further comprising transitioning said second auxiliary boost switch between conducting and nonconducting states under a substantially zero current condition.

12. The method as recited in claim 8 further comprising transitioning said first and second auxiliary boost switches from a nonconducting to a conducting state proximally.

13. The method as recited in claim 8 further comprising transitioning said first auxiliary boost switch to a nonconducting state while said second auxiliary boost switch is in a conducting state.

14. The method as recited in claim 8 wherein said auxiliary three phase full-wave rectifier comprises six diodes arranged in a bridge.

15. A three-phase split boost converter, comprising:
a primary stage, including:
an input,
a primary rectifier coupled to said input,
first and second primary boost switches coupled to said primary rectifier, and
first and second outputs coupled to said first and second primary boost switches, respectively; and
an auxiliary stage interposed between said input and said first and second outputs and including:
first, second and third auxiliary boost inductors coupled to corresponding phases of said input; and
an auxiliary boost network interposed between said first, second and third auxiliary boost inductors and said first and second outputs and including:
an auxiliary three phase full-wave rectifier,
first and second auxiliary boost diodes, and
first and second auxiliary boost switches, coupled between said auxiliary three phase full-wave rectifier and said first and second auxiliary boost diodes, that cooperate to conduct currents through said first, second and third auxiliary boost inductors to reduce input current total harmonic distortion (THD) at said input of said three-phase split boost converter.

16. The converter as recited in claim 15 wherein said first and second auxiliary boost switches are coupled across said auxiliary three phase full-wave rectifier.

17. The converter as recited in claim 15 wherein said first auxiliary boost switch is interposed between said first and second auxiliary boost diodes.

18. The converter as recited in claim 15 wherein said second auxiliary boost switch transitions between conducting and nonconducting states under a substantially zero current condition.

19. The converter as recited in claim 15 wherein said first and second auxiliary boost switches transition from a nonconducting to a conducting state proximally.

20. The converter as recited in claim 15 wherein said first auxiliary boost switch transitions to a nonconducting state while said second auxiliary boost switch is in a conducting state.

21. The converter as recited in claim 15 wherein said auxiliary three phase full-wave rectifier comprises six diodes arranged in a bridge.

* * * * *